US010744994B2

(12) United States Patent
Beyer

(10) Patent No.: US 10,744,994 B2
(45) Date of Patent: Aug. 18, 2020

(54) CVT LOCKING PRIMARY CLUTCH

(71) Applicant: Supreme Tool & Machine, Inc., Waterford, MI (US)

(72) Inventor: Mark Beyer, Waterford, MI (US)

(73) Assignee: SUPREME TOOL & MACHINE, INC., Waterford, MI (US)

(*) Notice: Subject to any disclaimer, the term of this patent is extended or adjusted under 35 U.S.C. 154(b) by 343 days.

(21) Appl. No.: 15/671,416

(22) Filed: Aug. 8, 2017

(65) Prior Publication Data

US 2018/0037212 A1   Feb. 8, 2018

Related U.S. Application Data

(60) Provisional application No. 62/372,107, filed on Aug. 8, 2016.

(51) Int. Cl.
| | | |
|---|---|---|
| *B60W 10/02* | (2006.01) | |
| *F16H 9/18* | (2006.01) | |
| *F16H 63/06* | (2006.01) | |
| *F16H 61/662* | (2006.01) | |
| *F16H 55/56* | (2006.01) | |

(Continued)

(52) U.S. Cl.
CPC ............ *B60W 10/02* (2013.01); *F16H 9/18* (2013.01); *F16H 9/26* (2013.01); *F16H 55/563* (2013.01); *F16H 55/566* (2013.01); *F16H 61/662* (2013.01); *F16H 63/067* (2013.01); *B60W 50/082* (2013.01); *B60W 2510/0638* (2013.01);

(Continued)

(58) Field of Classification Search
CPC ...... F16H 55/563; F16H 55/566; F16H 55/56; F16H 9/18; F16H 9/12; F16H 9/125; F16H 9/14; F16H 63/06; F16H 63/067; F16H 63/34; F16H 63/3408; F16H 63/36; F16H 61/662; F16H 2061/66295; B60W 10/02; B60W 50/082; B60W 2510/0638; B60W 2540/10
See application file for complete search history.

(56) References Cited

U.S. PATENT DOCUMENTS 3,362,242 A * 1/1968 Watkins ................ F16H 55/563
474/15
3,653,283 A * 4/1972 Betz .................. F16H 61/66263
477/46

(Continued)

*Primary Examiner* — Michael R Mansen
*Assistant Examiner* — Raveen J Dias
(74) *Attorney, Agent, or Firm* — Dickinson Wright, PLLC

(57) ABSTRACT

A primary clutch assembly for a continuously variable transmission is provided. The primary clutch assembly includes a fixed sheave and a movable sheave centered on a post for joint rotation therewith. A rotational unit disposed on the post generates centrifugal forces during rotation of the post that are translated axially to urge the movable sheave along the post towards the fixed sheave. The primary clutch utilizes an actuator assembly that is configured to establish a locked condition that prevents axial movement of the movable sheave as the rotational unit builds-up centrifugal force and an unlocked condition to allow sudden axial movement of the movable sheave towards the fixed sheave. The actuator assembly includes a bearing unit that extends through a hole in the post to contact the movable sheave in the locked condition and is housed within the hole and spaced from the movable sheave in the unlocked condition.

16 Claims, 4 Drawing Sheets

(51) Int. Cl.
    *F16H 9/26*         (2006.01)
    *B60W 50/08*      (2020.01)
    *F16H 59/06*      (2006.01)

(52) U.S. Cl.
    CPC ......... *B60W 2540/10* (2013.01); *F16H 59/06* (2013.01); *F16H 2061/66295* (2013.01)

(56) References Cited

U.S. PATENT DOCUMENTS

| | | | | |
|---|---|---|---|---|
| 3,698,256 | A * | 10/1972 | Albertson | F16H 55/563 474/12 |
| 3,750,486 | A * | 8/1973 | Belanger | F16H 55/563 474/14 |
| 3,939,720 | A * | 2/1976 | Aaen | F16H 55/563 474/14 |
| 7,207,920 | B2 | 4/2007 | Jonsson et al. | |
| 8,409,039 | B2 * | 4/2013 | Beyer | F16H 55/563 474/14 |
| 9,228,644 | B2 * | 1/2016 | Tsukamoto | F16H 55/563 |
| 2012/0244974 | A1 * | 9/2012 | Tsuji | F16H 61/66272 474/28 |
| 2014/0315670 | A1 * | 10/2014 | Mariotti | F16H 61/66245 474/12 |
| 2018/0172148 | A1 * | 6/2018 | Trent | F16H 9/18 |
| 2018/0355966 | A1 * | 12/2018 | Mariotti | F16H 9/125 |

\* cited by examiner

CVT LOCKING PRIMARY CLUTCH

CROSS REFERENCE TO RELATED APPLICATION

This U.S. Utility Patent Application claims the benefit of and priority to U.S. Provisional Patent Application Ser. No. 62/372,107 filed Aug. 8, 2016. The disclosure of the above application is incorporated by reference herein as if fully set forth in its entirety herein.

BACKGROUND OF THE INVENTION

1. Field of the Invention

The present disclosure is generally related to clutch mechanisms. More particularly, the present invention relates to a primary clutch for a continuously variable transmission (CVT).

2. Related Art

This section provides background information related to the present disclosure which is not necessarily prior art.

One class of conventional continuously variable transmissions (or "CVT's") has two tapered-faced pulleys interconnected with a belt of essentially fixed length. The sheaves of each pulley are able, under control, to move axially. The pulley on one shaft is connected to the crankshaft of the engine. The system including the pulley and its ancillary parts that is connected to the engine is called the driving, or primary clutch. The other pulley is connected through a linkage to the drive train of a vehicle. This other pulley and its related parts, is called the driven or secondary clutch. Of necessity, when the sheaves of either pulley are close together, the associated belt must be located at a relatively large radius (distant from the axis of rotation of the pulley) and when the sheaves of a pulley are far apart, the associated belt must be located at a relatively small radius (close to the axis of rotation of the pulley).

Typically, because of the essentially fixed length of the belt, when the sheaves of one pulley are far apart, then the sheaves of the other pulley must be close together. Larger shift ratios, characteristic of slower vehicle speeds, occur when the sheaves of the primary pulley are far apart and the sheaves of the secondary pulley are close together. With this configuration, the rotational speed of the primary pulley is greater than the rotational speed of the secondary pulley. Smaller shift ratios, characteristic of higher vehicle speed, occur when the sheaves of the primary pulley are close together and the sheaves of the secondary pulley are far apart. With this configuration, the rotational speed of the primary pulley is less than the rotational speed of the secondary pulley.

Ordinarily, the primary clutch has a compression spring, or the like, tending to push a stationary and movable sheave apart from one another such that, at rest and in this unengaged position of the primary clutch, the sheaves of the primary pulley have opened to allow the belt to lie close to the pulley's rotational axis, effecting a large shift ratio. Such a belt position at rest results in the engine having a desirable minimal load at the start of driving. The force produced by this spring increases as the sheaves of the primary pulley get closer together (lower shift ratios) and further compress the spring. Other parts of the primary clutch include a set of pivoting flyweights which are pivotably mounted on the rotatable or movable sheath of the primary clutch and which pivot radially outwardly due to centrifugal force as the primary clutch spins at a higher rpm. As the flyweights pivot outwardly, they are pushed on a roller, or the like, to effectuate axial movement of the movable sheath towards the stationary sheath to contact the belt and establish an engaged position of the primary clutch.

In the known CVT systems, the net result of the spring and flyweights of the primary clutch provide some beneficial results. Specifically, these CVT systems yield a primary pulley belt side force that is sufficient to allow the engine to start and promptly get up to approximately a rotational speed where the engine can deliver maximum power to its shaft. These CVT systems also yield a belt side force that increases with increasing vehicle speed (decreasing shift ratio) to a peak. Another benefit of these CVT systems is that they provide a belt side force that decreases with increasing vehicle speed.

However, an undesirable result of these prior CVT systems is that they do not provide a high or quick engagement of the primary clutch such as is desired in racing applications. In an effort to provide higher rates of engagement, larger higher rate springs, notched cam arms or spring plungers have been utilized. However, each of these efforts have led to inconsistent results. Thus, a need exists to continue development of new and improved primary clutches for a CVT that advance the art and provide for higher engagement of the primary clutch with more consistent results.

SUMMARY OF THE INVENTION

The subject invention provides a primary clutch assembly for a continuously variable transmission. The primary clutch assembly includes a fixed sheave and a movable sheave disposed on a post for joint rotation therewith. The primary clutch also includes a rotational unit for generating centrifugal forces when rotated with the post and sheaves. The centrifugal forces are translated into an axial force that urges the movable sheave along the post towards the fixed sheave. The primary clutch further includes an actuator assembly that is configured to establish a locked condition, wherein the movable sheave is prevented from moving axially but still allowed to rotate as the rotational unit builds-up centrifugal force. The actuator assembly is also configured to establish an unlocked condition of the primary clutch assembly to allow sudden axial movement of the movable sheave towards the fixed sheave.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

Figure 1:
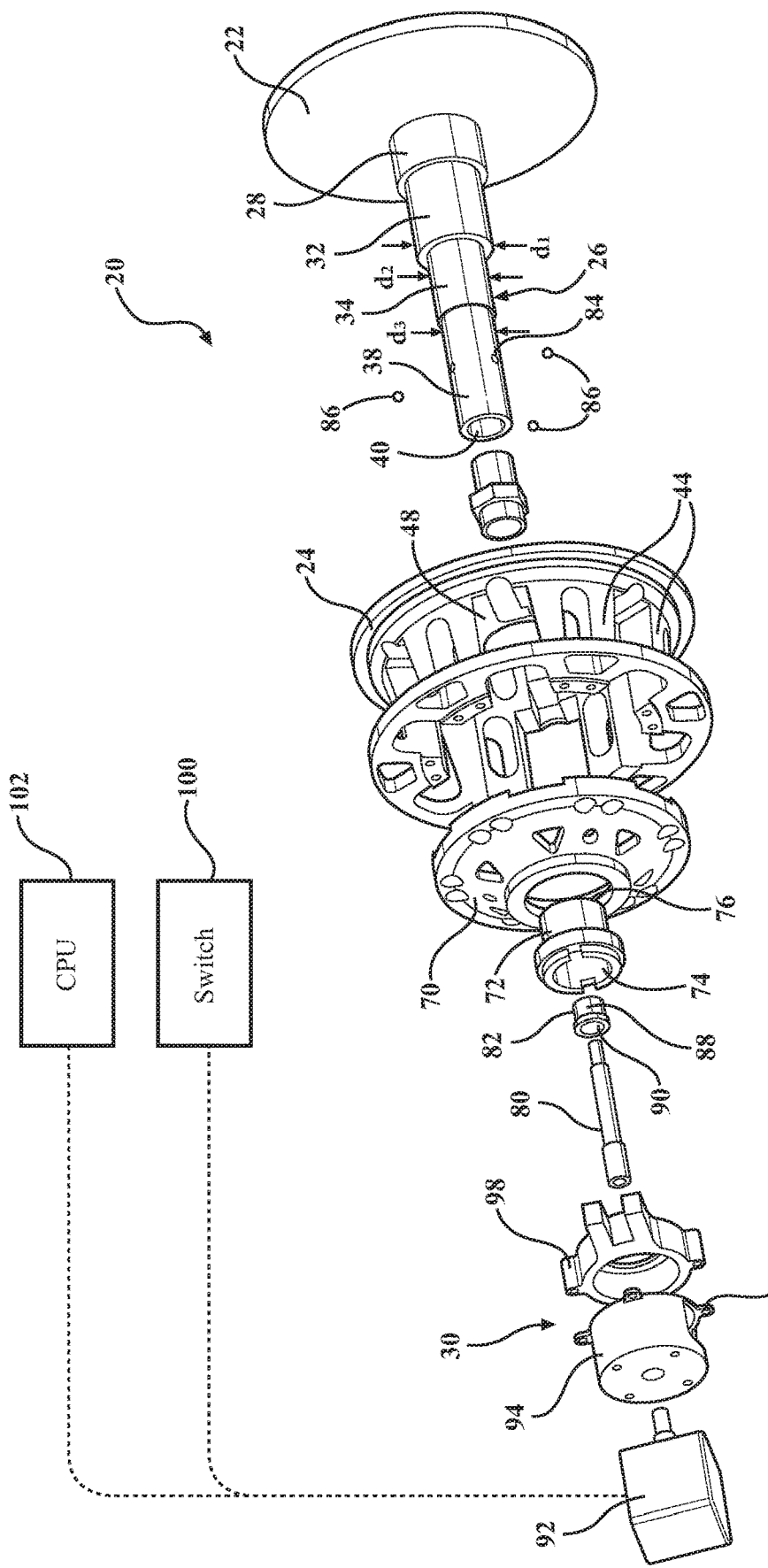
FIG. 1 is an exploded view of a primary clutch assembly for a continuously variable transmission (CVT) according to an example embodiment.

Example embodiments will now be described more fully with reference to the accompanying drawings. In general, the subject embodiments are directed to a primary clutch for a CVT. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, the primary clutch of the present invention is intended for use in applications utilizing high performance engines with continuously variable transmission belt driving systems. These CVT systems are known in the art to be used in many different types of vehicles, such as snowmobiles, golf carts, go-karts, all-terrain vehicles, riding lawn mowers, electric-powered cars, and the like. These systems are also known to be used on many different types of machines used in the manufacturing and service industries. It should also be appreciated that the present invention can be utilized in connection with other types of vehicles or machines.

The continuously variable belt driving system is connected to a horizontal shaft that is in communication with an engine. The primary clutch 20 or driving clutch is mounted on the engine, for example a driving shaft 21 for joint rotation. The system also includes a driven clutch (not expressly shown) mounted on a driven shaft that is rotatably mounted to the vehicle such that it is parallel to the driving shaft 21. An endless drive belt (not expressly shown) connects the primary clutch 20 to the driven clutch to effectuate rotation thereof.

With reference to the Figures, the primary clutch 20 includes a fixed sheave 22 and a movable sheave 24. The primary clutch 20 is mounted in any of a variety of known suitable methods such that the fixed sheave 22 is located inboard (closer to the engine) of the movable sheave 24. The fixed sheave 22 is secured to a post 26 at a bottom end 28 thereof. The post 26 defines an outer circumference. The movable sheave 24 is disposed on the outer circumference of the post 26 such that it is axially movable toward and away from the fixed sheave 22. Axial movement between sheaves 22, 24 can generally be accomplished by centrifugal forces which urge the movable sheave 24 toward the fixed sheave 22 in response to torque needs of the secondary or driven clutch. The magnitude of centrifugal force is directly correlated to the speed at which the post 26 spins the movable sheave 24. Therefore, the speed of axial movement between sheaves 22, 24 is generally limited by the time it takes to accelerate the post 26 and generate enough centrifugal force to urge the movable sheave 24 towards the fixed sheave 22.

Figure 3:
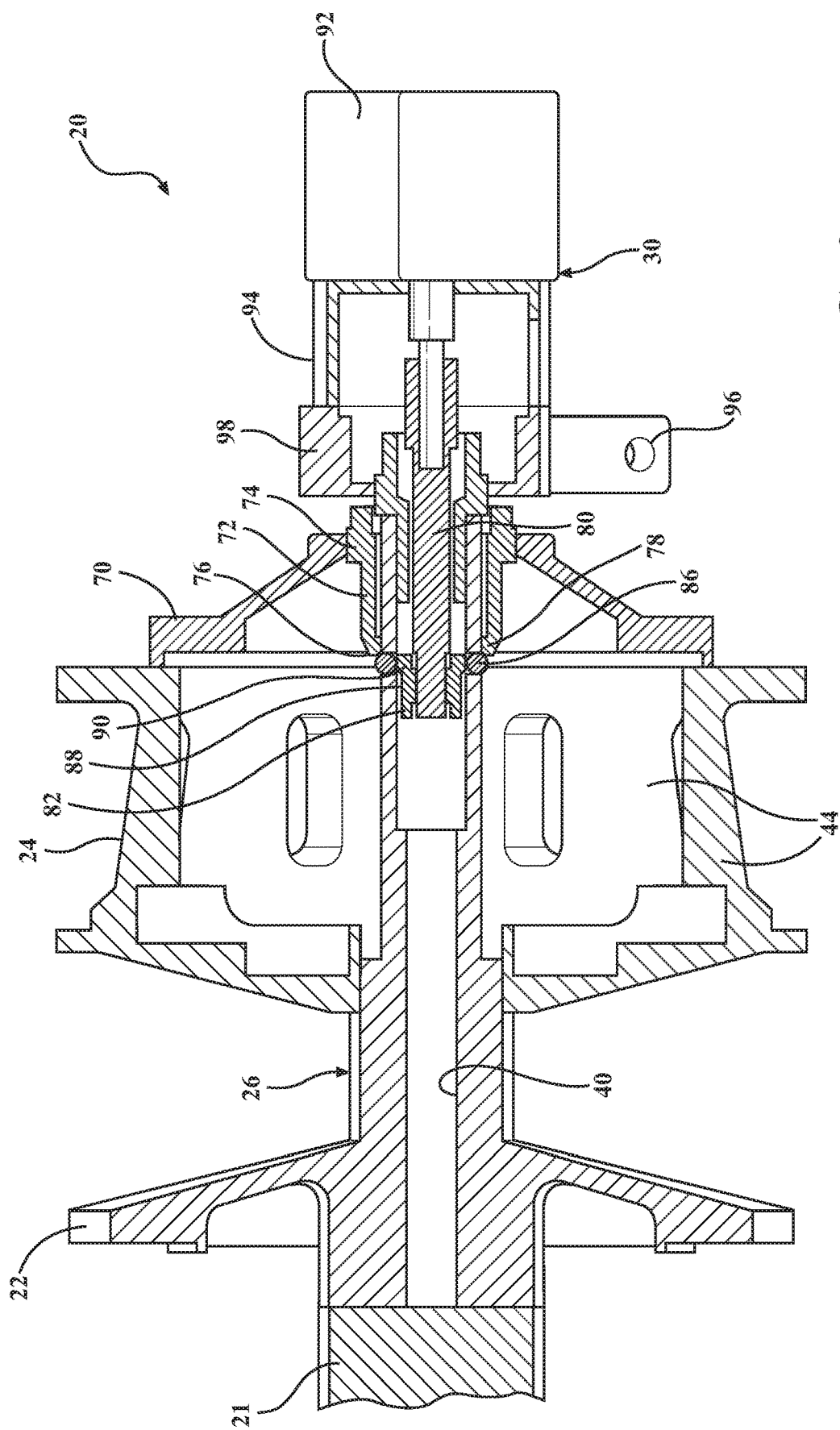
FIG. 3 is a cross-sectional fragmentary view illustrating the primary clutch in a locked condition.
Figure 4:
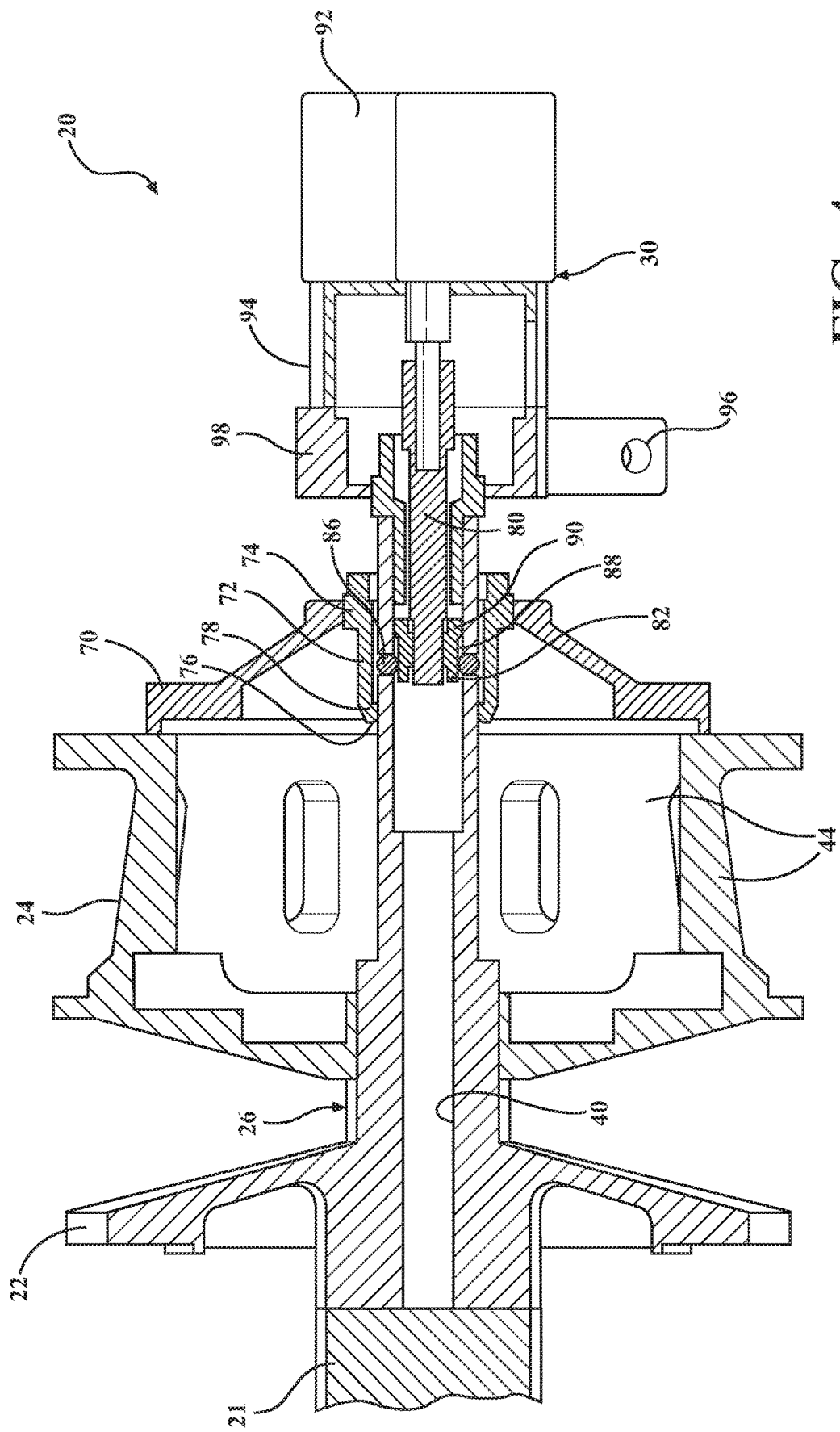
FIG. 4 is a cross-sectional fragmentary view illustrating the primary clutch in an unlocked condition.

As best illustrated in FIGS. 3 and 4, the sheaves 22, 24, of the primary clutch 20 each have tapered faces oriented towards one another for placement of the belt therebetween.

In operation, the space between the sheaves 22, 24 will determine the effective diameter of the belt that spins around the rotating primary clutch 20, the change in effective diameter of the primary clutch 20 is an inverse to the change of effective diameter around the secondary clutch. Accordingly, as the sheaves 22, 24 are spaced further apart the belt moves radially inwardly towards the post 26 shrinking the effective diameter of the primary clutch 20 which enlarges the effective diameter around the secondary clutch, essentially providing a small gear in the primary clutch 20 and a large gear in the secondary clutch. When the effective diameter of the primary clutch 20 is larger than the secondary clutch the driven shaft will spin faster than the driving shaft 21 based on the gear ratios between clutches. Conversely, as the sheaves 22, 24 of the primary clutch 20 are moved together, the effective diameter increases (forming the equivalent of a larger gear) and the driving shaft will now move slower than the driven shaft.

To overcome the limited axial acceleration between sheaves 22, 24 an actuator assembly 30 is utilized. The actuator assembly 30 includes a locked condition, wherein the movable sheave 24 is prevented from moving axially relative to the fixed sheave 22 even at high rotational velocity of the post 26. Said another way, in the locked condition the actuator assembly 30 is able to overcome the centrifugal force applied axially to the movable sheave 24 towards the fixed sheave 22. The actuator assembly 30 further includes an unlocked condition, wherein the movable sheave 24 is allowed to move axially under predetermined loads of centrifugal force applied axially. As a result, the changing of the primary clutch 20 from a locked condition to an unlocked condition allows for a quick response and movement between the fixed sheave 22 and the movable sheave 24 as the speed of axial movement is no longer limited by acceleration of the post 26.

As best shown in a preferred arrangement illustrated in FIG. 1, the post 26 has a lower portion 32 having a first diameter ($d_1$) and a middle portion 34 having a second diameter ($d_2$) that is smaller than the first diameter ($d_1$). The middle portion 34 is threaded, splined or hexed to fix a rotational unit, such as a spider assembly 36 thereon. The post 26 also includes an upper portion 38 with a third diameter ($d_3$) that is smaller than the second diameter ($d_2$). The bottom end 28 of the post 26 engages the drive shaft 21 to effectuate rotation of the post 26 and the sheaves 22, 24. The post 26 can obviously have a variety of different shapes and configurations, for example, the post 26 could have a hexagonal cross-section. However, in any arrangement the post 26 defines a passageway 40 extending through the lower portion 32, the middle portion 34, and the upper portion 38.

The movable sheave 24 includes a plurality of primary pivots 42 located thereon. The primary pivots 42 are disposed radially about the circumference of the movable sheave 24. In one preferred embodiment, each primary pivot 42 is secured between a pair of adjacent tower portions 44 that extend upwardly from a base portion 46 of the movable sheave 24. When secured in place, each primary pivot 42 spans an opening 48 formed between adjacent tower portions 44. This configuration provides structural support for the primary pivots 42 and minimizes failure when a flyweight is disposed thereon, as discussed in more detail below. In accordance with one embodiment, the movable sheave 24 has four primary pivots 42 equally spaced about its periphery. However, it will be understood that the number of primary pivots 42 and attached flyweights can vary as required.

Each primary pivot 42 has a primary flyweight 50 rotatably coupled thereto. Each primary flyweight 50 has a head portion 52 through which a respective primary pivot 42 passes and a body portion 54 extending from the head portion 52. The body portion 54 includes a cam surface 56. Each of the primary pivots 42 defines an axis of rotation for the attached primary flyweight 50 and the axis of rotation for each of the primary flyweights 50 lies in the same horizontal plane. This horizontal plane is oriented perpendicular to an axis of rotation of the post 26 and engine drive shaft 21. Each primary flyweight 50 is positioned on a respective primary pivot 42 such that it can pivot within an opening 48 between adjacent tower portions 44 as the primary clutch 20 rotates. The plurality of primary flyweights 50 assist in moving the movable sheave 24 in increasing amounts in response to increasing rotational speed of an associated driving shaft 21 and post 26, as will be discussed in more detail below.

Each of the tower portions 44 also includes a secondary roller 58 secured thereto. The secondary rollers 58 are secured to an individual tower portion 44 to ensure their structure stability and integrity. In a preferred embodiment, there are four secondary rollers 58 uniformly spaced around the periphery of the movable sheave 24. However, more or less secondary rollers 58 may be included as desired.

Figure 2A:
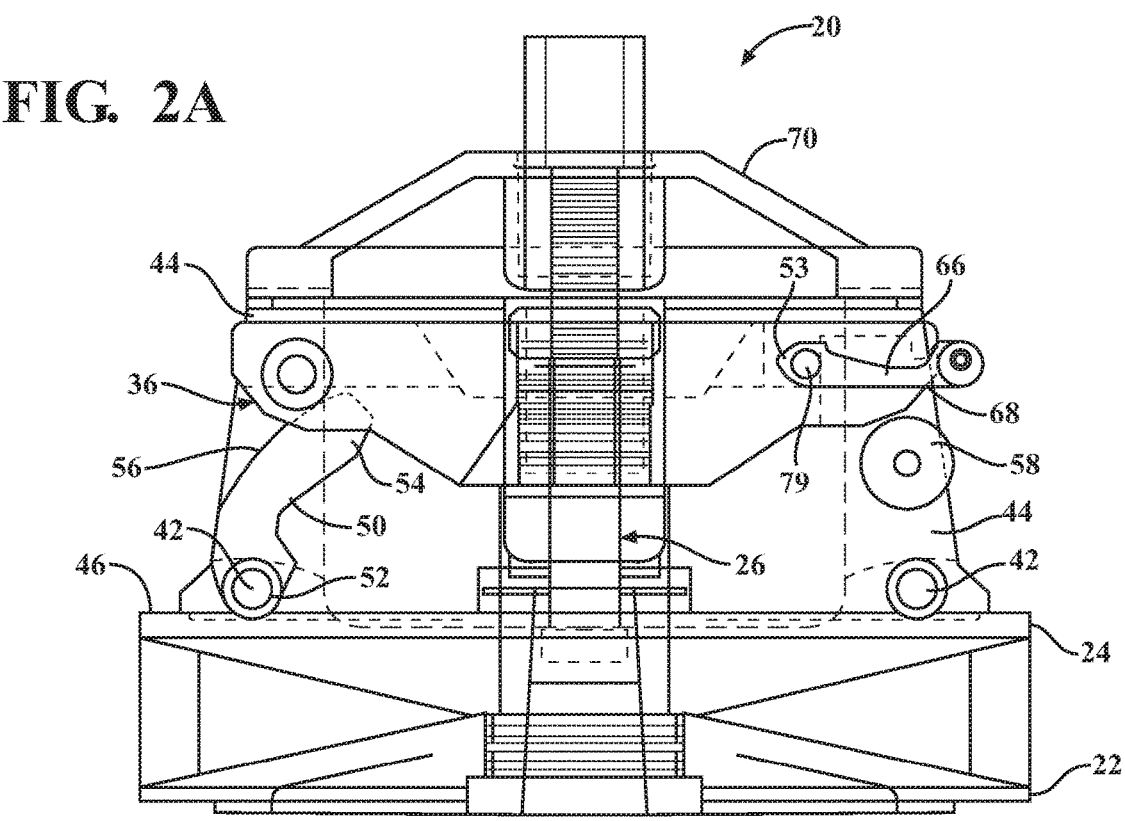
FIG. 2A is a side view of the primary clutch assembly including a rotational unit according to yet another example embodiment.
Figure 2B:
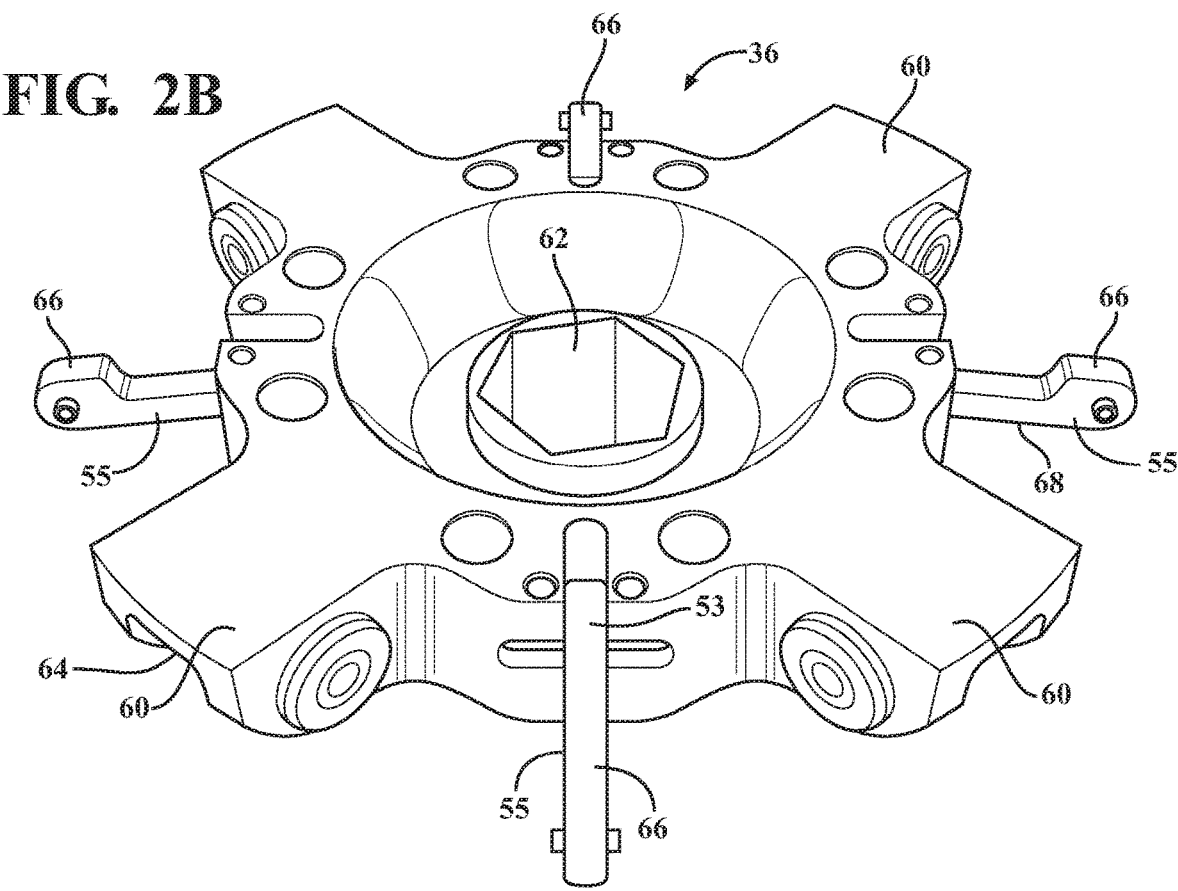
FIG. 2B is a perspective view of one embodiment of the rotational unit.

In one embodiment the rotational unit includes a spider assembly 36, as illustrated in FIGS. 2A and 2B, which is a separate component from the movable sheave 24 and includes a plurality of spokes 60. Each of the spokes 60 extends radially outwardly from a center portion 62. In one arrangement the center portion 62 defines a hexagonal aperture, wherein a sleeve with a hexagonal outer profile is attached to the post 26 and inserted into the center portion 62 to ensure joint rotation therewith. Each of the spokes 60 is received within one of the openings 48 between the adjacent tower portions 44 such that the spider assembly 36 is retained in place as the primary clutch 20 and thus the fixed sheave 22 and the movable sheave 24 rotate. Each of the spokes 60 of the spider assembly 36 includes a spider roller 64 disposed in an underside thereof. As each spider roller 64 spans an opening 48, it can engage a respective cam surface 56 of one of the primary flyweights 50 as it pivots.

The spider assembly 36 also includes a plurality of secondary flyweights 66 that extend outwardly from the center portion 62. The secondary flyweights 66 are positioned on the spider assembly 36 between the spokes 60 and are intended to contact a respective one of the secondary rollers 58. The secondary flyweights 66 have a secondary head portion 53 that is pivotally secured to the spider assembly 36 and a secondary body portion 55 that extends outwardly therefrom. The secondary body portion 55 of the secondary flyweight 66 includes a secondary cam surface 68 that engages the secondary roller 58. The spider assembly 36 is positioned such that the secondary flyweights 66 pass through an opening 48 in a respective tower portion 44 with the secondary cam surface 68 engaging an upper side of the secondary roller 58.

The secondary flyweights 66 also assist in urging the movable sheave 24 in increasing amounts in response to increasing rotational speed of the driving shaft 21 and post 26. The secondary flyweights 66 are located on a separate member (the spider assembly 36) from the primary flyweights 50 (the movable sheave 24). The secondary flyweights 66 also have a respective axis of rotation that all lie in the same horizontal plane. The plane in which the axis of rotation of the secondary flyweights 66 are disposed is parallel to the plane of the axis of rotation of the primary flyweights 50. Thus, the primary flyweights 50 lie generally in a first plane and the secondary flyweights 66 lie in a second plane. The first and second planes are parallel to one another and lie perpendicular to the axis of rotation of the primary clutch 20. A cover 70 is attached to the tower portions 44 and engages the post 26 for axial movement. The cover 70 defines a cover stop 72 extending from a first end 74 towards the fixed clutch to a second end 76. The second end 76 includes an inward bend 78 with a hooked profile that is disposed in engaging relationship with the post 26 for facilitating this axial movement along the post 26 and relative to the fixed sheave 22.

As the movable sheave 24 travels toward the fixed sheave 22, the spider assembly 36 moves further apart from the movable sheave 24. This is due to the pivoting of the primary flyweights 50 and their engagement with the spider rollers 64. Additionally, at this speed of rotation, the centrifugal force has caused the secondary flyweights 66 to rotate about a pivot bar 79. Up to this point (rotational speed), the secondary flyweights 66 apply an additional downward force on the movable sheave 24. In this preferred embodiment, the spider assembly 36 can be axially and rotationally affixed to the post 26 so that the primary flyweights 50 of the movable sheave 24 essentially push off of the spider assembly 36 and towards the fixed sheave 22 during rotation. While the rotational unit is often described herein as including a spider assembly 36, it should be appreciated that the rotational unit could be any assembly that is utilized for converting rotational energy into a directed axial force.

As best illustrated in FIGS. 1, 3 and 4, the actuator assembly 30 selectively prevents axial movement of the movable sheave 24 relative to fixed sheave 22 during rotational movement of the driving shaft 21 and the post 26. The actuator assembly 30 includes a plunger shaft 80 disposed within and extending along the passageway 40. The plunger shaft 80 is interconnected to an actuator 82 that is movable from a first position (unlocked condition) to a second position (locked condition) to effectuate axial locking of the movable sheave 24, i.e., prevent the movable sheave 24 from axially moving towards to fixed sheave 22. The post 26 defines a plurality of holes 84 extending into the passageway 40, and the actuator assembly 30 includes a plurality of bearing units. In a preferred embodiment, the bearing units are ball bearings 86 each disposed within one of the holes 84. As is understood in the art, a biasing member (not expressly shown) can be utilized to prejudice the movable sheave 24 away from the fixed sheave 22 which must be overcome by centrifugal forces applied axially.

As best illustrated in FIGS. 3 and 4, the actuator 82 includes a wall portion 88, having a first actuator diameter, which is disposed in abutting relationship with the ball bearings 86 in the first or unlocked condition of the actuator assembly 30, wherein the ball bearings 86 are spaced from the movable sheave 24 in a retracted position. The actuator 82 also includes a lip portion 90 extending radially outwardly defining a second actuator diameter that is greater than the first actuator diameter. In the locked condition of the actuator assembly 30, the lip portion 90 is disposed in abutting relationship with the ball bearings 86 which are pushed outwardly into contact with the movable sheave 24, in an extended position to prevent axial movement.

In operation, the plunger shaft 80 is moved or advanced along the passageway 40 in response to influence of the actuator assembly 30. As best illustrated in FIGS. 3 and 4, during this movement the wall portion 88 of the actuator 82 slides along the ball bearings 86 until the lip portion 90 forces the ball bearings 86 outwards and through the holes 84 defined by the post 26. The ball bearings 86 prevent the second end 76 of the cover stop 72 from axially moving along the post 26, locking and preventing the movable sheave 24 from axial movement and thus establishing the locked condition. Put another way, even if the movable sheave 24 is being rotated by the drive shaft 21, and the centrifugal forces are urging the movable sheave 24 towards the fixed sheave 22, the ball bearings 86 establish a mechanical lock which prevents axial movement of the movable sheave 24 towards the fixed sheave 22 and mechanically stops and prevents the primary clutch 20 from changing gear ratios with the secondary clutch.

In a preferred arrangement, the actuator assembly 30 includes a cylinder 92, or the like, which is interconnected to the plunger shaft 80 to effectuate movement of the plunger shaft 80 and actuator 82 between the locked and unlocked conditions. In one embodiment the cylinder 92 is a pneumatic double action air-activated cylinder 92, however, it should be appreciated that the cylinder 92 could be electrical, a hand cable, or any other suitable method of applying force to axially move the plunger shaft 80. The cylinder 92 is preferably mounted on a top of the primary clutch 20 to a suspended bearing block 98 so that the cylinder 92 does not rotate with the sheaves 22, 24. In a preferred arrangement, the suspended bearing block 98 can include a cylinder mount 94 and a bearing carrier or bracket 96 and can be connected to a substantially static part, i.e., a part that does not spin such as a chassis. A bearing sleeve can be inserted into an end of the post 26 adjacent to the cylinder 92 that includes a stepped end that extends radially outwardly beyond the outer circumference of the post 26 and acts as a stop for the first end 74 of the cover stop 72 as the movable sheave 24 moves away from the fixed sheave 22.

In yet another preferred arrangement, the actuator assembly 30 includes a manual switch 100, for example, a button, handbrake, or pedal that is electrically connected to the cylinder 92 for manually energizing the cylinder 92. For example, the manual switch 100 could be disposed near the driver of the vehicle and engaged prior to revving up the engine. As previously described, the cylinder 92 pushes the plunger shaft 80 and the actuator 82 through the passageway 40 of the post 26 to engage the ball bearings 86 with the lip portion 90 of the actuator 82 and push the ball bearings 86 outwardly through the holes 84. If the manual switch 100 is engaged before revving up the engine, the driver can go to wide open throttle, but the primary clutch 20 will be prevented from engaging because even though the movable sheave 24 is rotating during revving, because the ball bearings 86 prevent the movable sheave 24 from axially moving towards the fixed sheave 22. The driver could continue to hold the manual switch 100 while waiting for a signal on the line. Upon signal, the driver could release the manual switch 100, which releases the cylinder 92, causing the plunger shaft 80 and the actuator 82 to pull back, allowing the ball bearings 86 to retract back though the holes 84 and into the passageway 40. This then allows the movable sheave 24 to rapidly move towards the fixed sheave 22 in response to the built-up centrifugal forces, resulting in a high or quick engagement of the primary clutch 20 and a faster change in gear ratio between the primary clutch 20 and the driven clutch.

It should be appreciated that the actuator assembly 36 could also include a CPU such as a custom programmable E.C.U. unit 102 that is electrically connected to the manual switch 100 or directly to the cylinder 92. The E.C.U. unit 102 would include programming an rpm rev limit to whatever rpm is needed when staging the vehicle into the beams and for controlling receipt and sending of the actuation signal. In this arrangement, the E.C.U. unit 102 could have a programed threshold of rpm. Once the rpm is over the threshold, the E.C.U. unit 102 would send a command to the actuator assembly 30 to change from the locked condition to the unlocked condition, effectuating axial movement of the movable sheave 24. It is also possible to program the E.C.U. to command the actuator assembly 30 to switch conditions after the passage of a predetermined amount of time. In arrangements with both a switch 100 and an E.C.U. unit 102, the switch can turn the E.C.U. unit on and off.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A primary clutch assembly for a continuously variable transmission comprising:

a fixed sheave and a moveable sheave centered on a post for joint rotation therewith;

a rotational unit coupled to said post to generate centrifugal forces during rotation of said post and axially urge said moveable sheave along said post towards said fixed sheave;

said post having an outer circumference and defining at least one hole extending through said post to said outer circumference;

an actuator assembly interchangeable from a locked condition wherein said actuator assembly counteracts said centrifugal forces increasing in said rotational unit and prevents axial movement of said moveable sheave towards said fixed sheave to an unlocked condition wherein said actuator assembly releases said built-up centrifugal forces and allows sudden axial movement of said moveable sheave towards said fixed sheave to quickly engage said primary clutch assembly;

wherein said actuator assembly includes at least one bearing unit movable between an extended position wherein said at least one bearing unit extends through said at least one hole outwardly beyond said outer circumference to contact and block said moveable sheave from moving axially in said locked condition and a retracted position wherein said at least one bearing unit is retracted and disposed inwardly from said outer circumference to release said moveable sheave and allow said sudden axial movement;

wherein said post bounds a passageway extending axially therethrough and said actuator assembly includes a plunger shaft disposed in and axially moveable along said passageway and an actuator sleeved around the plunger shaft and axially moveable in said passageway with said plunger shaft between said locked and said unlocked conditions and in contact with said at least one bearing unit for moving said at least one bearing unit between said extended and retracted positions; and wherein said actuator includes a wall portion having an interior surface in contact with said plunger shaft and an exterior surface in contact with said at least one bearing unit in said retracted position and a lip portion extending radially outwardly from said exterior surface of said wall portion and in contact with and holding radially outwardly said at least one bearing unit in said extended position.

2. An assembly as set forth in claim 1 wherein said plunger shaft extends into said passageway to a terminal end located within said passageway and wherein said actuator is connected to said plunger shaft adjacent to said terminal end.

3. An assembly as set forth in claim 2 wherein said actuator assembly includes a cylinder connected to said plunger shaft for generating force to move said plunger shaft.

4. An assembly as set forth in claim 3 wherein said actuator assembly includes a switch disposed in electrical communication with said cylinder for manually switching said actuator assembly between said locked condition and said unlocked condition.

5. An assembly as set forth in claim 3 wherein said actuator assembly includes a programmable E.C.U. unit disposed in electrical communication with said cylinder and commanding said actuator assembly between said locked condition and said unlocked condition.

6. An assembly as set forth in claim 5 wherein said E.C.U. unit is programed to include a threshold rpm of said post before sending a command to change said actuator assembly between said locked condition and said unlocked conditions.

7. An assembly as set forth in claim 5 wherein said E.C.U. unit is programed to send a command to change said actuator assembly between locked and unlocked conditions after a predetermined passage of time.

8. An assembly as set forth in claim 5 wherein said actuator assembly includes a switch in electrical communication with said E.C.U. unit enabling and disabling said E.C.U. unit to command said cylinder.

9. An assembly as set forth in claim 3 wherein said actuator assembly includes a bearing block preventing joint rotation of said cylinder with said post.

10. An assembly as set forth in claim 9 wherein said actuator assembly includes a bracket connected to said cylinder for attaching to a static part of a vehicle.

11. An assembly as set forth in claim 1 wherein said at least one bearing unit includes at least one ball bearing.

12. An assembly as set forth in claim 11 wherein said at least one ball bearing includes a plurality of ball bearings radially spaced adjacent to said outer circumference of said post and wherein said at least one hole includes a plurality of holes guiding said plurality of ball bearings between said extended position and said retracted position.

13. An assembly as set forth in claim 1 wherein said rotational unit includes a spider assembly disposed on said post adjacent to said moveable sheave.

14. An assembly as set forth in claim 13 wherein said moveable sheave includes at least one primary flyweight attached thereto and said spider assembly includes at least one secondary flyweight attached thereto.

15. A primary clutch assembly for a continuously variable transmission comprising:
    a fixed sheave and a moveable sheave centered on a post for joint rotation therewith;
    a rotational unit coupled to said post to generate centrifugal forces during rotation of said post and axially urge said moveable sheave along said post towards said fixed sheave;
    said post having an outer circumference and defining at least one hole extending through said post to said outer circumference;
    an actuator assembly interchangeable from a locked condition wherein said actuator assembly counteracts said centrifugal forces increasing in said rotational unit and prevents axial movement of said moveable sheave towards said fixed sheave to an unlocked condition wherein said actuator assembly releases said built-up centrifugal forces and allows sudden axial movement of said moveable sheave towards said fixed sheave to quickly engage said primary clutch assembly; and
    wherein said moveable sheave includes a cover defining a stop that is in contact with and blocked by said at least one bearing unit when said at least one bearing unit is in said extending position and prevents axial movement of said moveable sheave towards said fixed sheave.

16. An assembly as set forth in claim 15 wherein said stop extends along said outer circumference of said post from a first end to a second end; and
    said second end includes an inward bend extending radially inwardly in contact with said outer circumference of said post.

* * * * *